US009025505B2

(12) United States Patent
Satapathy et al.

(10) Patent No.: US 9,025,505 B2
(45) Date of Patent: May 5, 2015

(54) SYSTEM AND METHOD FOR PROVIDING QUALITY OF SERVICE TO VOICE-OVER-IP TRAFFIC ON A WIRELESS RADIO ACCESS NETWORK

(75) Inventors: Durga Prasad Satapathy, Ashburn, VA (US); Richard Martin Cane, Dundee, IL (US); Dhaval Dipak Mehta, Reston, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1096 days.

(21) Appl. No.: 12/723,235

(22) Filed: Mar. 12, 2010

(65) Prior Publication Data
US 2011/0222470 A1    Sep. 15, 2011

(51) Int. Cl.
*G08C 17/00*  (2006.01)
*H04L 29/06*  (2006.01)
*H04L 12/725* (2013.01)

(52) U.S. Cl.
CPC ........... *H04L 65/1083* (2013.01); *H04L 45/302* (2013.01); *H04L 65/80* (2013.01)

(58) Field of Classification Search
USPC ......... 370/311, 328, 329, 338, 395.2, 395.21, 370/395.4, 395.41
See application file for complete search history.

(56) References Cited

U.S. PATENT DOCUMENTS

| | | | |
|---|---|---|---|
| 7,756,120 B2 * | 7/2010 | Fieremans et al. | 370/352 |
| 8,331,299 B2 * | 12/2012 | Kim et al. | 370/329 |
| 2002/0141390 A1 * | 10/2002 | Fangman et al. | 370/352 |
| 2004/0082339 A1 * | 4/2004 | Lee | 455/453 |
| 2008/0076420 A1 * | 3/2008 | Khetawat et al. | 455/435.1 |
| 2009/0296616 A1 * | 12/2009 | Lim et al. | 370/311 |
| 2010/0027457 A1 * | 2/2010 | Okuda | 370/315 |
| 2010/0220673 A1 * | 9/2010 | Hui et al. | 370/329 |

OTHER PUBLICATIONS

Qualcomm VoIP Overview, Qualcomm Incorporated, Aug. 2008 (11 pages).
Chung et al., "Performance Evaluation of VoIP over EV-DO Rev A", Nov. 2006 (8 pages).

* cited by examiner

*Primary Examiner* — Alvin Zhu

(57) ABSTRACT

In various embodiments, a system, network node, and method of providing voice communications in a wireless packet communications system includes registering a communications path between a gateway (GW) and a base station (BS); establishing a real-time service flow in the BS; activating the real-time service flow over an air interface between the BS and a terminal device; requesting, by the terminal device, that zero bandwidth be allocated by the BS to the activated real-time service flow in the absence of voice traffic to or from the terminal device; requesting, by the terminal device, that sufficient bandwidth be allocated by the BS to the activated real-time service flow when voice traffic to or from the terminal device is detected by the terminal device; and transmitting and/or receiving the voice traffic over the registered communications path via the activated real-time service flow.

40 Claims, 6 Drawing Sheets

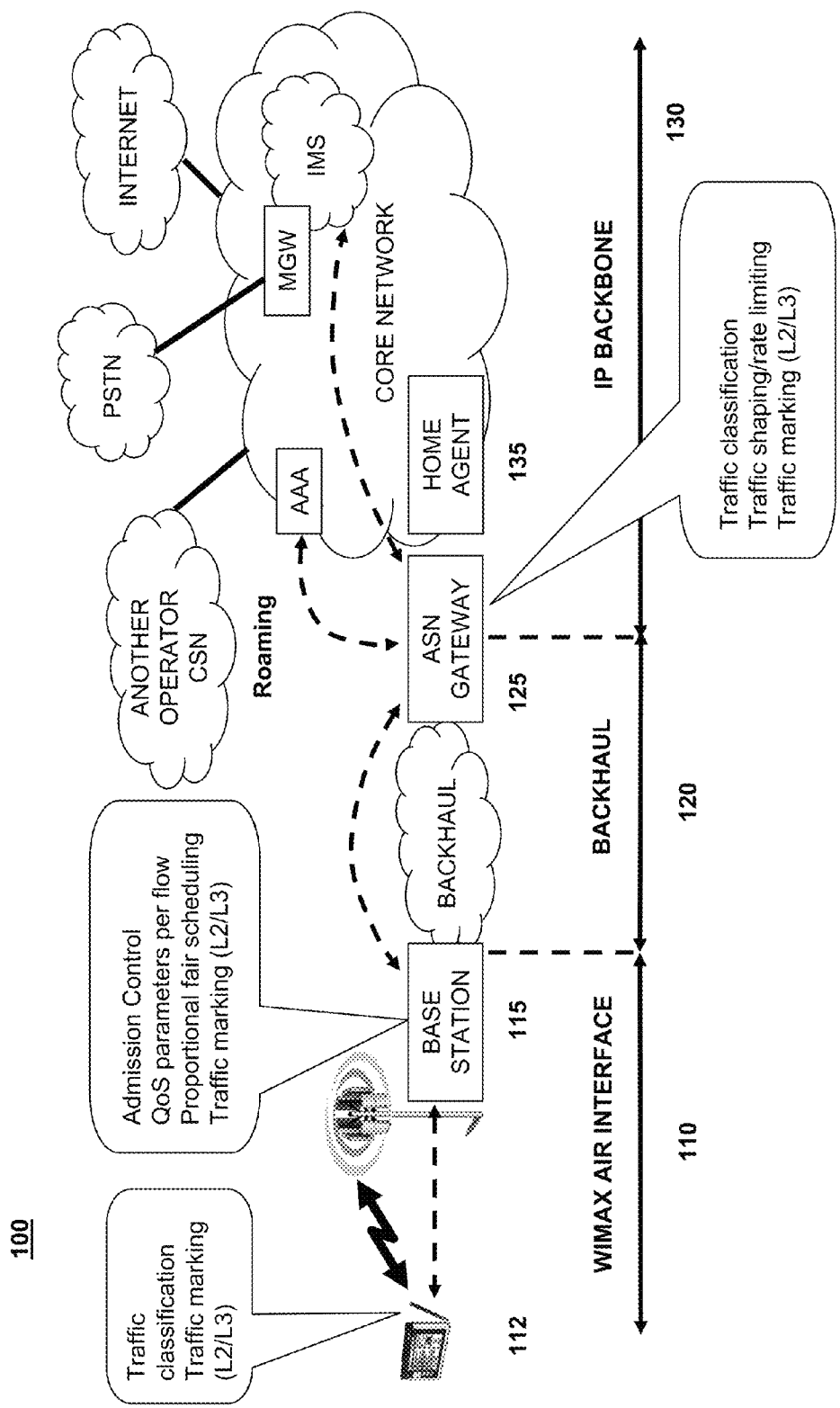
FIG. 1 (CONVENTIONAL)

SYSTEM AND METHOD FOR PROVIDING QUALITY OF SERVICE TO VOICE-OVER-IP TRAFFIC ON A WIRELESS RADIO ACCESS NETWORK

BACKGROUND

This disclosure is generally related to wireless communications technologies, including fourth generation Worldwide Interoperability for Microwave Access ("WiMAX") and/or Long-Term Evolution (LTE) technologies. In one or more embodiments, this disclosure is directed to an apparatus, system, and method useful for providing operator-configurable service level Quality-of-Service (QoS) to Voice-over-IP (VoIP) traffic in a Radio Access Network (RAN) using pre-provisioned service flows (SF) in, for example, a WiMAX RAN (W-RAN).

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their third generation or "3G" counterpart devices. WiMAX and LTE devices and networks are examples of "4G" technologies.

Quality of Service is determined by various factors, including variable signal conditions on the wireless link; throughput, latency/delay and transmission errors which vary much more widely over a wireless connection because of the constantly changing radio signal conditions and extensive digital radio processing. Standard internet protocols, designed for use over a more stable wire-based connection, are not well-suited to handle these variations.

Further, limited wireless resources must be shared among different types of traffic, i.e., the same wideband channel must be shared among many user sessions and each user session may involve many different types of data streams and protocols. Some applications may require bursty, time-sensitive, small-packet data transmissions, while other applications require long, error-sensitive large-packet data streams. To provide acceptable service levels for different types of traffic, the network must be able to identify and combine many different types of traffic from many different users without compromising the performance of any of the different user applications.

WiMAX and other 4G systems present various traffic scheduling challenges. For example, the quality of the wireless channel is typically different for different users and randomly changes with time (on both slow and fast time scales). Further, wireless bandwidth is considered to be a scarce resource that needs to be used efficiently. Mobility further complicates resource allocations.

WiMAX uses scheduling for QoS by classifying all traffic into separate service flows. Each service flow is assigned different QoS parameters that govern minimum and maximum throughput rates, maximum latency and jitter, etc. A resource scheduler in the base station allocates air interface resources differently for each service flow type. Traffic within the same service flow type may be further differentiated by traffic priority values assigned to users. The resource scheduler also dynamically accounts for users' signal conditions when allocating non-real-time resources. In general, allocations to users with better signal conditions are weighted so they receive more resources (to maximize overall sector throughput), but an operator can adjust fairness to ensure users with poor signal conditions also receive reasonable throughput. The WiMAX base station can be configured to mark traffic according to the service flow type to enable consistent end-to-end QoS across multiple networks. The WiMAX Access Services Network Gateway (ASN-GW) can also be configured to mark traffic to enable other networks/elements to provide QoS consistent with the air interface. FIG. 1 depicts conventional end-to-end WiMAX system 100 illustrating the various stages of traffic marking at WiMAX air interface 110, including mobile station (MS) 112, base station (BS) 115; backhaul 120 between BS 115 and ASN-GW 125, and IP backbone 130 that includes home agent 135 and a core network.

Admission control is performed by the BS during network entry and re-entry for statically-provisioned service flows, e.g. initial service flows, and is also performed by the BS in response to dynamic BS-initiated or MS-initiated requests to create service flows. Further, Admission control is performed by the BS during handovers. Admission control can be used to limit the amount of total air interface resources that are consumed by real-time service flows. Since real-time service flows are allocated resources before non-real-time and best effort service flows, this feature prevents real-time traffic from "starving" best effort traffic.

A fundamental feature of WiMAX involves the classification of traffic into separate service flows. Different QoS attributes can be defined for each service flow based on the type of traffic. To support multimedia applications, the mobile WiMAX IEEE 802.16e standard defines five types of data delivery service flows for downlink (DL) flows, and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP; nrtPS—Non-real Time Polling Service, time insensitive, but require a minimum bandwidth allocation; and BE—Best Effort. Uplink is differentiated from downlink because uplink flows (except UGS) involve some form of request/grant mechanism for resource allocations. Each data delivery services consists of a specific set of QoS parameters and is designed to support different types of traffic streams.

Table I summarizes the various WiMAX data delivery service types.

TABLE I

| DL data delivery service | UL scheduling service | Targeted traffic |
| --- | --- | --- |
| Unsolicited grant service (UGS) | Unsolicited grant service (UGS) | Constant bit rate (CBR) services, TDM services |
| Extended real-time Variable Rate (ERT-VR) | Extended real-time polled service (ertPS) | VoIP with silence suppression/activity detection |
| Real-time Variable Rate (RT-VR) | Real-time polled service (rtPS) | Streaming audio & video |
| Non-real-time Variable Rate (NRT-VR) | Non-real-time polled service (nrtPS) | File transfers |
| Best Effort (BE) | Best Effort (BE) | Web browsing, e-mail, etc. |

Each of these service flow types has different QoS requirements and is designed to support different types of traffic streams. The order of priority given to services while transmitting is generally as follows: UGS>ertPS>rtPS>nrtPS>BE. However, the particular scheduling mechanism is generally left to proprietary implementations.

Since the BS governs resource scheduling, uplink resources must either be allocated automatically on a periodic basis, or requested individually as needed by the MS. Resources for UGS and ertPS service flows are periodically allocated according to an unsolicited grant interval (UGI) defined for each service flow. The ertPS service flows can also dynamically request additional resources, i.e., more throughput, as described below. Resources for rtPS, nrtPS and BE service flows must be individually requested (usually triggered by data in the MS buffer.) The BS can automatically offer dedicated uplink opportunities for specific ertPS, rtPS and nrtPS service flows to request bandwidth on a periodic basis (unsolicited polling interval). The ertPS, rtPS, nrtPS and BE service flows can also request bandwidth during a shared uplink opportunity, subject to contention. Once UL resources have been granted, requests for additional UL resources can be "piggybacked" on existing allocations.

Key WiMAX QoS Parameters for various service types are provided in Table II, below:

TABLE II

| Parameter | UGS | ertPS | rtPS | nrtPS | BE |
|---|---|---|---|---|---|
| Grant interval | ✓ | ✓ | | | |
| Maximum latency | ✓ | ✓ | ✓ | | |
| Tolerated jitter | ✓ | ✓ | | | |
| Minimum reserved traffic rate (MRTR) | ✓ | ✓ | ✓ | ✓ | |
| Maximum sustained traffic rate (MSTR) (plus maximum traffic burst) | ✓ | ✓ | ✓ | ✓ | ✓ |
| Traffic priority | | ✓ | ✓ | ✓ | ✓ |

LTE is the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. However, it does not fully comply with the International Mobile Telecommunications (IMT) Advanced 4G requirements. Most major mobile carriers in the United States and several worldwide carriers have announced plans to convert their networks to LTE beginning in 2009. LTE is a set of enhancements to the Universal Mobile Telecommunications System (UMTS) which is introduced in 3rd Generation Partnership Project (3GPP) Release 8, with further enhancements in Release 9. These enhancements focus on adopting 4G mobile communications technology, including an all-IP flat networking architecture.

Much of the LTE development work is aimed at simplifying the architecture of the LTE system, as it transits from the existing UMTS circuit-switched/packet switched combined network, to an all-IP flat architecture system.

LTE supports both Frequency Division Duplex (FDD) and Time Division Duplex (TDD) modes. While FDD makes use of paired spectra for uplink (UL) and downlink (DL) transmission separated by a duplex frequency gap, TDD alternates by using the same spectral resources used for UL and DL, separated by guard time. Each mode has its own frame structure within LTE and these are aligned with each other meaning that similar hardware can be used in the base stations and terminals to allow for economy of scale.

LTE uses OFDM for the downlink—that is, from the base station to the terminal. OFDM meets the LTE requirement for spectrum flexibility and enables cost-efficient solutions for very wide carriers with high peak rates. OFDM is a well-established technology, for example in standards such as IEEE 802.11a/g, 802.16, HIPERLAN-2, DVB and DAB. In the LTE downlink, there are three main physical channels. The Physical Downlink Shared Channel (PDSCH) is used for all the data transmission, the Physical Multicast Channel (PMCH) is used for broadcast transmission using a Single Frequency Network, and the Physical Broadcast Channel (PBCH) is used to send most important system information within the cell. Supported modulation formats on the PDSCH are Quadrature Phase Shift Keying (QPSK), 16 Quadrature Amplitude Modulation (QAM) and 64 QAM. For MIMO operation, a distinction is made between single user MIMO, for enhancing one user's data throughput, and multi user MIMO for enhancing the cell throughput.

In LTE's uplink, for the Physical Uplink Shared channel (PUSCH) only, LTE uses a pre-coded version of OFDM called Single Carrier Frequency Division Multiple Access (SC-FDMA). This is to compensate for a drawback with normal OFDM, which has a very high peak-to-average power ratio (PAPR). High PAPR requires expensive and inefficient power amplifiers with high requirements on linearity, which increases the cost of the terminal and drains the mobile station's battery faster. In LTE's uplink, there are three physical channels. While the Physical Random Access Channel (PRACH) is only used for initial access and when the User Equipment (UE) or MS is not uplink synchronized, all the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16 QAM and 64 QAM.

WiMAX and LTE have many similar features. For example, WiMAX utilizes CQI, throughput, CINR, and MIMO that are all present in LTE. QoS is also similar between WiMAX and LTE. LTE employs dedicated bearers similar to service flows in WiMAX. Admission control is applied for guaranteed bit rate bearers in LTE similar to WiMAX. LTE bearers can be configured for semi-persistent scheduling similar to unsolicited grants for UGS and ertps service flows in WiMAX. Both LTE and WiMAX provide mechanisms to suspend and resume semi-persistent/unsolicited grant resource allocations.

One problem with conventional approaches to VoIP traffic is that current 4G standards, e.g., the IEEE 802.16e standard, do not have native support for VoIP in the Media Access Control (MAC) layer. The standard does define the mechanisms for Service Flows (SF) to provide QoS for applications like VoIP. Two of the key challenges for supporting voice service on a WiMAX or LTE network are related to identifying the traffic and applying the proper QoS.

What is needed is a system and method for VoIP wireless communications that removes dependencies on RAN systems or devices, e.g., a MSS. What also needed is a system and method for VoIP wireless communications that is relatively simple to implement and which makes scarce bandwidth (BW) allocation for a VoIP call much quicker and efficiently than conventional approaches. What is even further needed is a system and method for VoIP wireless communications that allows a service provider to deploy a common VoIP architecture over different RAN vendor platforms, without placing any requirements or requiring modifications to a MS to support VoIP.

SUMMARY

The apparatus, system, and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16 (Wireless Metropolitan Area Networks—WMAN), IEEE 802.16e (mobile WiMAX), and WiMAX Forum NWG 1.0/NWG 1.5 communication standard specifications and/or communication implementation documentation. However, this disclosure is not necessarily limited to use with such systems and methods. For example, similar concepts may be applied to 4th generation LTE systems and methods.

Various embodiments of this disclosure are useful in defining a method for managing VoIP traffic on a RAN, for example a WiMAX radio access network (W-RAN). Various embodiments employ pre-provisioned service flows to provide an operator-configurable service level (QoS) for VoIP traffic traversing the wireless RAN. Further, this disclosure uses a novel combination of the QoS mechanisms supported by the current version of WiMAX to support QoS for VoIP traffic.

Embodiments of this disclosure are approximately as efficient as a solution employing dynamic service flows, without the complexity of packet inspection or dynamic service flows. Air interface resources for VoIP are only allocated when a call is in progress. Further, various embodiments described herein automatically adapt the allocated air interface resources to the BW required for the call, and can support different VoIP coders-decoders ("codecs") with different bandwidths, and can work with or without voice activity detection enabled on the codec. In addition, the inventive concept described herein does not require the network or the subscriber device to detect call events or trigger any network features based on call events, and enables VoIP service to be provided using any subscriber modem with a VoIP softphone or analog telephone adapter (ATA) that supports silence suppression for extended real-time service flows.

In one embodiment, a method of providing voice communications in a wireless packet communications system includes registering a communications path between a gateway (GW) and a base station (BS); establishing a real-time service flow in the BS; activating the real-time service flow over an air interface between the BS and a terminal device; requesting, by the terminal device, that zero bandwidth be allocated by the BS to the activated real-time service flow in the absence of voice traffic to or from the terminal device; requesting, by the terminal device, that sufficient bandwidth be allocated by the BS to the activated real-time service flow when voice traffic to or from the terminal device is detected by the terminal device; and transmitting and/or receiving the voice traffic over the registered communications path via the activated real-time service flow.

In another embodiment, a network node in a wireless packet communications network includes a transceiver configured to selectively transmit and receive data over the wireless network; a processor operatively coupled to the transceiver and configured to: activate a real-time service flow over an air interface between the network node and another node in the wireless network; process a request that zero bandwidth be allocated to the activated real-time service flow in the absence of voice traffic over the air interface; process a request that sufficient bandwidth be allocated to the activated real-time service flow when voice traffic over the air interface is detected; and passing the voice traffic to a different network via a registered communications path.

In another embodiment, a wireless packet communications system includes a communications path registered between a gateway (GW) and a base station (BS); a real-time communications path established through the BS to a terminal device over an air interface, wherein the terminal device requests that zero bandwidth be allocated by the BS to the real-time communications path in the absence of voice traffic on the air interface; wherein the terminal device requests that sufficient bandwidth be allocated by the BS to the real-time communications path when voice traffic is detected on the air interface, and wherein the BS forwards the voice traffic over the registered communications path to another network.

In another embodiment, an article of manufacture comprises a physical computer-readable medium that contains computer instructions thereon which, when executed by a processor, cause the processor to carry out the functions of activating a real-time service flow over an air interface between a first network node and a second node in a wireless packet communications network; processing a request that zero bandwidth be allocated to the activated real-time service flow in the absence of voice traffic over the air interface; processing a request that sufficient bandwidth be allocated to the activated real-time service flow when voice traffic over the air interface is detected; and passing the voice traffic to a different network via a registered communications path.

BRIEF DISCUSSION OF THE DRAWINGS

FIG. 1 illustrates end-to-end admission control and resource scheduling to manage QoS consistent with the wireless air interface in a conventional WiMAX 4G network;

FIG. 2 provides a block diagram of an exemplary embodiment of a mobile device of this disclosure;

DETAILED DESCRIPTION

In the discussion of various embodiments and aspects of the apparatus, system, and method of this disclosure, examples of a processor may include any one or more of, for instance, a personal computer, portable computer, personal digital assistant (PDA), workstation, web-enabled mobile phone, WAP device, web-to-voice device, or other device. Further, examples of mobile devices may include wireless phone handsets, smart phones, modems, laptop computers with embedded dual-mode functionality, and mobile Internet devices such as used for video streaming, for example, including dual-mode CDMA/4G mobile devices.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 2:
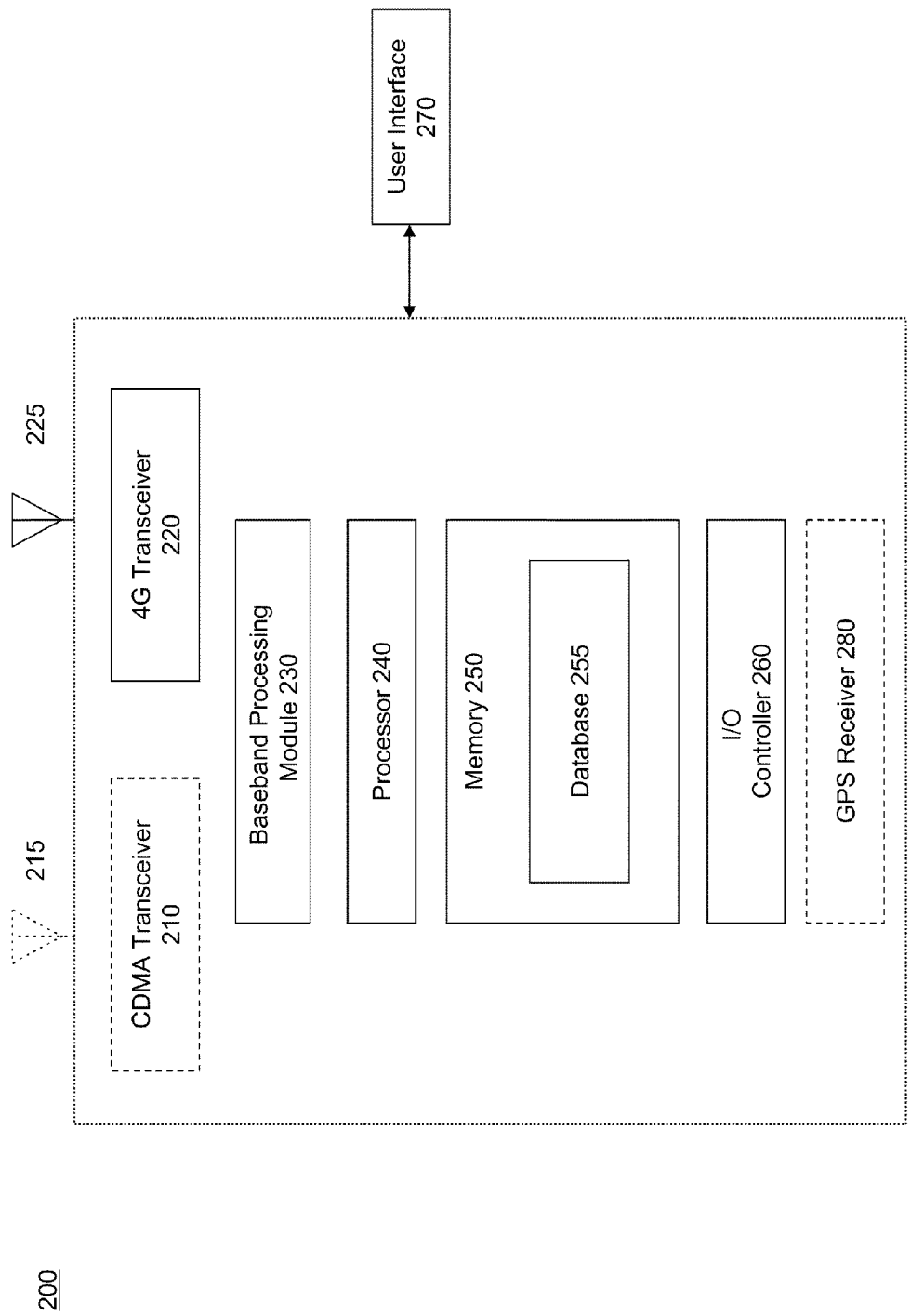

In FIG. 2, an exemplary embodiment of mobile device 200 includes 4G transceiver 220, operatively connected to antenna 225. In a dual-mode device implementation, optional CDMA transceiver 210 may be operatively connected to antenna 215. In a dual-mode configuration, alternative arrangements using a single antenna for both service types are possible. Baseband processing module 230 is configured to convert radio frequency (RF) signals from CDMA transceiver 210 and 4G transceiver 220 to baseband signals. Processor 240 may represent one or more processors configured to execute various functionality associated with processing of information received and/or transmitted from antennas 215 and/or 225, including processing of information to determine a desirable service flow for a particular type of traffic. Memory 250 may be configured to store various data and program instructions, and may include structured database 255 configured to store data related to device and network configurations. In addition, various flags and indices may also be stored with appropriate association and linking in the structured database 255. Input/output controller 260 may operate in conjunction with user interface 370 to allow display of information to a user, for example, as well as to receive input from the user using conventional input/output devices, among other purposes. Optional GPS receiver 280 may also be included in mobile device 200.

A VoIP service architecture can be implemented in a variety of ways, depending on whether the initiation of the call flow is triggered by the base station (BS) or by the mobile station (MS). Both MS and BS-initiated VoIP models are conventionally used, with significant dependencies on call identification, signaling, and processing functionality on either the MS or BS, respectively. One or more embodiments of this disclosure utilize a novel pre-provisioned VoIP architecture approach which removes major dependencies on the BS and MS, which are beneficial to a wireless service provider with networks having multiple radio access network (RAN) vendors, as well as a diverse device vendors. Aspects of this disclosure provide advantages over a BS or MS-initiated approach in that they remove dependencies on RAN systems or devices (e.g., mobile stations, MS), are relatively simple to implement, while allowing the bandwidth allocation for a VoIP call to be made much quicker than conventional schemes, while allowing a service provider to deploy a common VoIP architecture over different RAN vendor platforms without placing any requirements or requiring modifications to the mobile device or MS to support VoIP.

Subscribers to VoIP service are pre-provisioned with six service flows: One pair (DL and UL) of default service flows (SF) for best effort (BE) traffic and VoIP control and statistics traffic; one pair of non-real-time SFs for VoIP signaling traffic; and one pair of extended real-time service flows with silence suppression for VoIP bearer traffic. Service Profile IDs (ServiceProfileID) for the six SFs are provisioned in the Authentication, Authorization and Accounting server (AAA). Service profiles associated with these ServiceProfileIDs are defined in the Access Service Network Gateway (ASN-GW), or interface to the core network that oversees multiple gateway's handoffs.

The service profiles for the non-real-time and extended real-time service flows contain traffic classification rules to identify and direct the VoIP signaling traffic and VoIP bearer traffic to the appropriate service flows. The service profiles for all service flows contain QoS parameters as defined by IEEE 802.16e and the WiMAX System Profile 1.0. These parameters are distinct for each pre-provisioned SF and determine how the scheduler in the BS treats the traffic for each SF. The service profiles for all SFs also contain distinct differential services code point (DSCP) markings that are applied to the IP tunnel headers employed over the interface between the ASN-GW and BS, e.g., the R6 interface for WiMAX defined by the WiMAX Forum.

Key differentiating QoS parameters are defined for each type of service flow in Table III, below:

TABLE III

| QoS Parameter | Default | Non Real time | Extended Real time |
|---|---|---|---|
| Maximum latency defines the maximum delay for the service flow in milliseconds. | — | — | Yes |
| Tolerated jitter defines the maximum delay variation for the service flow in milliseconds. | — | — | Yes |
| Minimum reserved traffic rate (MRTR) defines the average minimum information rate for the service flow in bits per second. | — | Yes | Yes |
| Maximum sustained traffic rate (MSTR) defines the peak information rate for the service flow in bits per second. | Yes | Yes | Yes |
| Maximum traffic burst (MTB) defines the maximum continuous burst for the service flow in bytes. | Optional | Optional | Optional |
| Traffic priority defines the priority for traffic in the service flow relative to traffic in other service flows of the same type. | Optional | Optional | Optional |
| Unsolicited grant interval (UGI) defines the nominal interval in milliseconds between successive resource grants for the service flow. | — | — | Yes |
| Unsolicited poll interval (UPI) defines the nominal interval in milliseconds between successive opportunities to request resource grants. | — | Yes | — |
| ARQ attributes define whether ARQ is enabled or disabled for a service flow and its associated attributes if enabled. | Yes | Yes | Yes |

The current version of WiMAX technology enables traffic to be classified based upon the IP Five-tuple, i.e. the origination or destination IP address with Classless Inter-Domain Routing (CIDR) masks, the origination or destination port number (TCP or UDP) port, and/or type of traffic, e.g., TCP or UDP). Traffic can also be classified based on IP Type of Service or DSCP markings.

Embodiments of this disclosure employ static rules to classify traffic to the non-real-time and real-time service flows. These rules define classification attributes that are common for all VoIP calls. If all VoIP service flows traverse a common network element between the Core System Network (CSN) and VoIP core network, classification rules are based on attributes of the 5-tuple attributes of that network element. For example, VoIP signaling traffic can be classified based on type of traffic and common Session Initiation Protocol (SIP) port number assigned by the SBC; and VoIP bearer traffic is classified based on the type of traffic, the range of Real-Time Protocol (RTP) port numbers assigned by the SBC and the IP address of the SBC.

The classification rules may be defined more broadly to classify VoIP traffic associated with multiple network elements common to all VoIP traffic. For example, CIDR masks may be used to classify traffic to/from multiple network elements in the same address range. Multiple rules are used to classify traffic to/from multiple network elements with different five-tuple attributes (e.g. different IP address ranges.)

Figure 3:
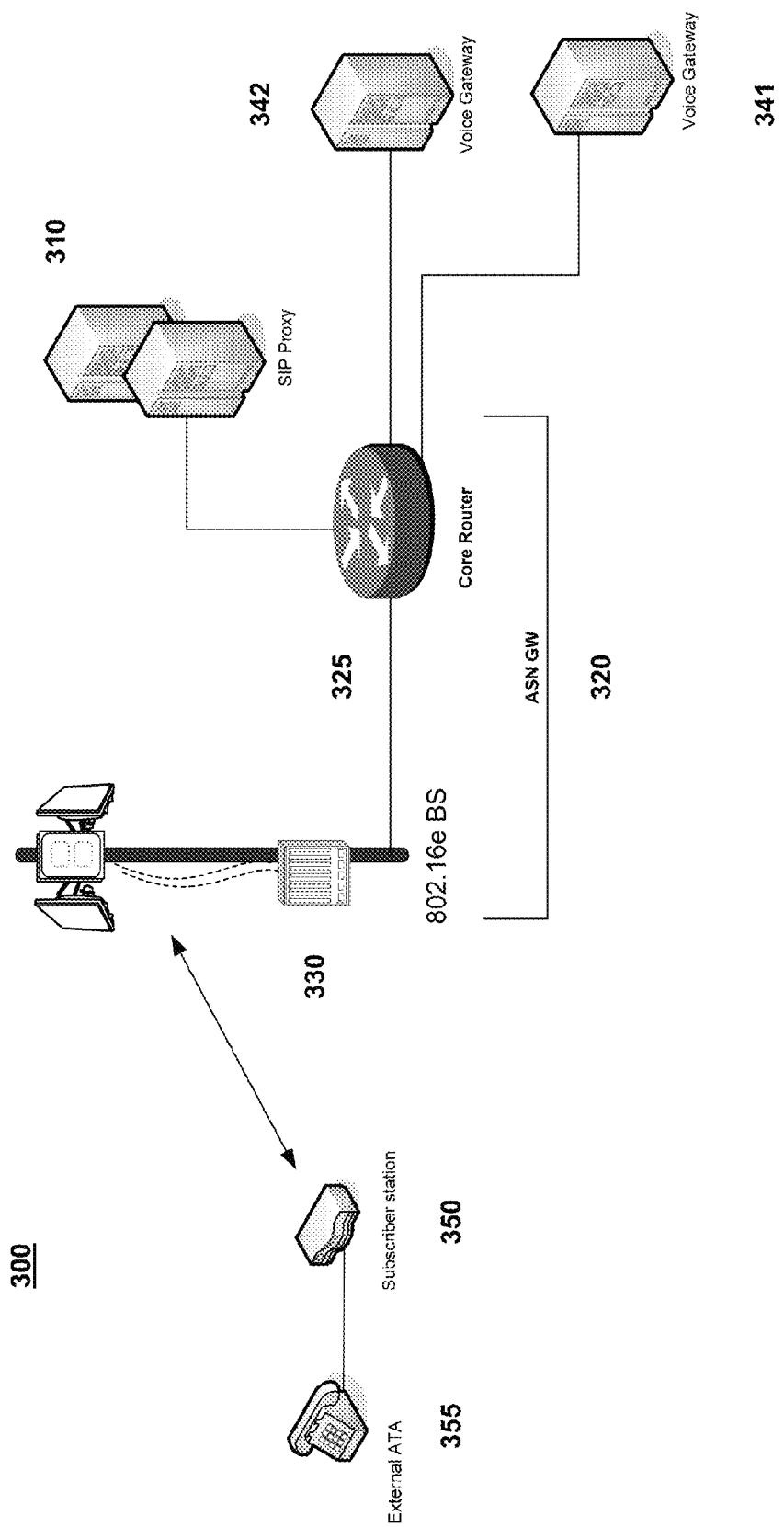
FIG. 3 illustrates a VoIP target architecture for a wireless RAN, e.g., a WiMAX RAN (W-RAN)

By way of example, FIG. 3 illustrates a VoIP target architecture 300 for a wireless RAN, e.g., a WiMAX RAN (W-RAN). Session Initiation Protocol (SIP) proxy server 310 and a number of Voice Gateways 341, 342 are connected to ASN-GW 320. ASN-GW 320 includes core router 325 and BS 330, e.g., an 802.16e configured BS. BS 330 communicates with subscriber station 350 (which may be fixed or mobile wireless-capable). Analog Telephone Adaptor (ATA) 355 permits consumers to easily utilize broadband services for VoIP with a conventional phone and wiring, while preserving existing infrastructure (phones, wiring, jacks, etc.), while providing number mobility.

The SIP protocol is designed to be independent of the underlying transport layer; it can run on Transmission Control Protocol (TCP), User Datagram Protocol (UDP), or Stream Control Transmission Protocol (SCTP). SIP is text-based, incorporating many elements of the Hypertext Transfer Protocol (HTTP) and the Simple Mail Transfer Protocol (SMTP), allowing for direct inspection by administrators. Further, the SIP is a signaling protocol, widely used for controlling multimedia communication sessions such as voice and video calls over Internet Protocol (IP). SIP can be used for creating, modifying and terminating two-party (unicast) or multiparty (multicast) sessions consisting of one or several media streams. The modification can involve changing addresses or ports, inviting more participants, adding or deleting media streams, etc. Other feasible application examples include video conferencing, streaming multimedia distribution, instant messaging, presence information and online games.

VoIP core networks typically use dynamic port numbers for RTP packets, so that a port-based rule is not specific enough. Also, destination and source IP addresses of voice gateways 341 and 342 are dynamically negotiated between the SIP endpoint and the SIP Proxy server based on the configuration of the VoIP service provider.

Figure 4:
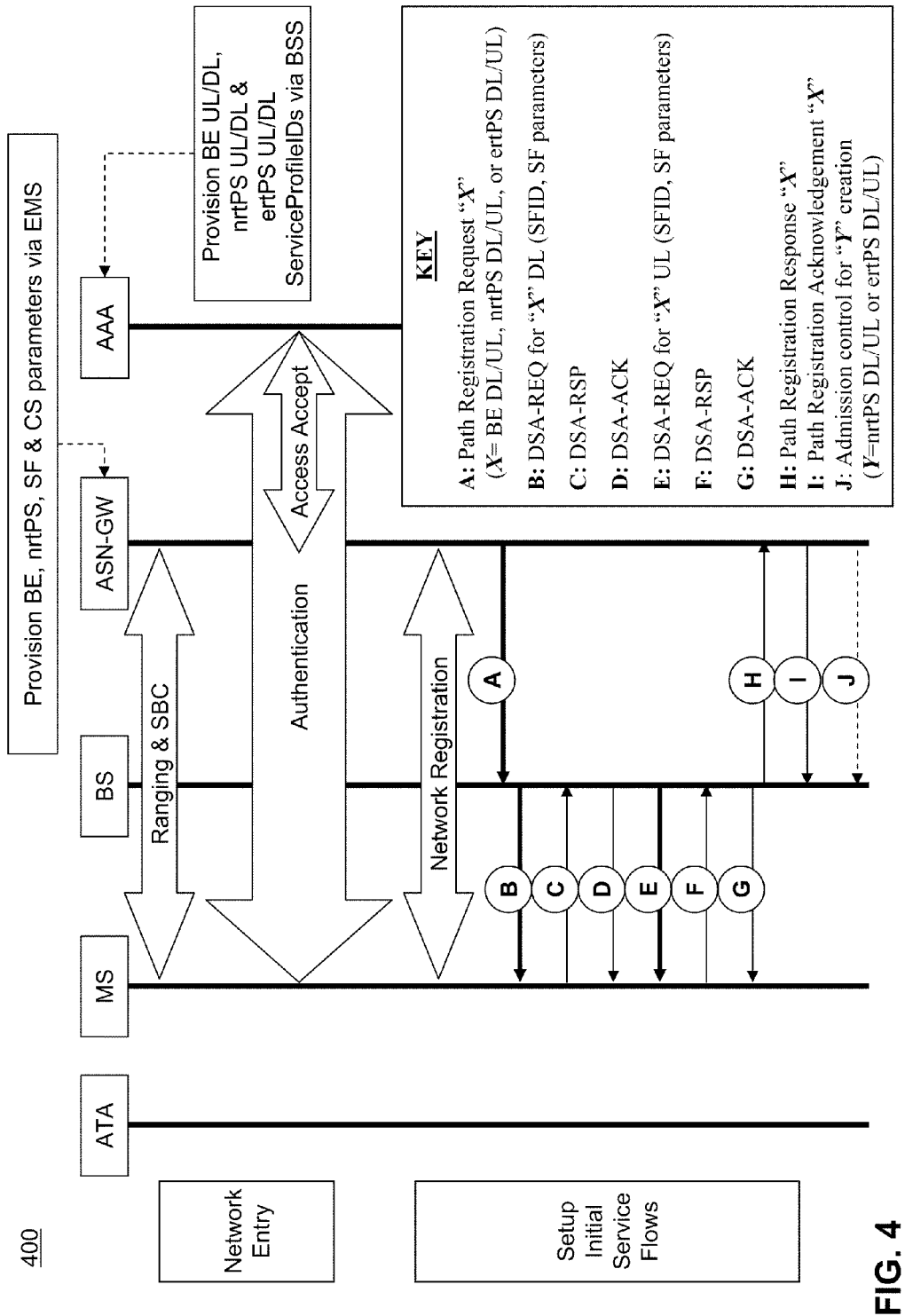
FIG. 4 illustrates a notional call flow for set-up of pre-provisioned service flows (SF)

With reference to the call process flows illustrated in provisioning process 400 in FIG. 4, during Network Entry, after a MS that is subscribed to VoIP service is authorized, the AAA sends an Access-Accept message to the ASN-GW containing the pre-provisioned ServiceProfileIDs. The ASN-GW associates the ServiceProfileIDs with its pre-provisioned service flow QoS descriptors and classification rules. The ASN-GW sends a Path_Reg_Req message to the BS to set-up R6 tunnels for each service flow, and to establish the six service flows in the BS.

The Path_Reg_Req (see "A" in FIG. 4, which represents X multiple path requests for BE, nrtPS, and ertPS DL and UL). The BS sends DSA-REQ messages to activate the default, non-real-time and extended real-time service flows over the air interface (see "B" in FIG. 4, which represents the X DSA requests for BE, nrtPS, and ertPS DL and UL). The BS immediately begins granting allocations equal to the Maximum Sustained Traffic Rate (MSTR) for the extended real-time service flow, per the unsolicited grant interval. Various responses ("RSP") and acknowledgements ("ACK") are represented by items "C" through "G" in FIG. 4, while ASN-GW receives/sends Path Registration Response/Path Registration Acknowledgement "H" and "I". For non-BE SFs represented by "Y", admission control is created, as represented by item "J" in FIG. 4. The BS may either sends six DSA-REQ messages, or a single DSA-REQ message containing all 6 service flow information to activate the default, non-real-time and extended real-time service flows over the air interface.

Figure 5A:
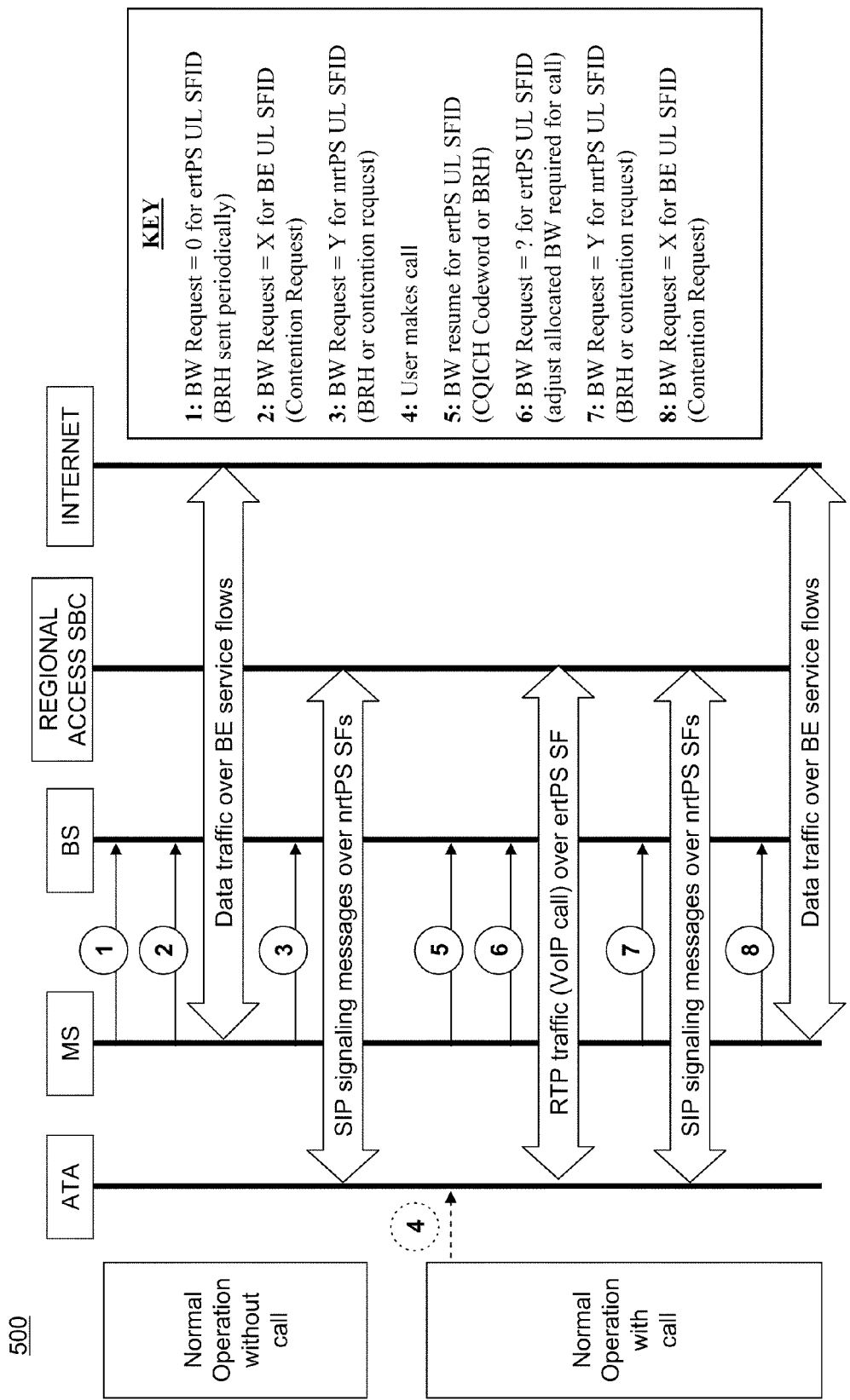
FIG. 5A illustrates exemplary call flows for a normal operation without a call event, and normal operation with a call event.

FIG. 5A illustrates exemplary call flows 500 for a normal operation without a call event, and normal operation with a call event. If no call is being made, the MS sends an ertPS Bandwidth Request Header equal to "0" to the BS (see "1" in FIG. 5A). Upon receipt of this message, the BS suspends grants. Even though grants have been suspended, having a "0" bandwidth request active for an ertPS UL makes for efficient VoIP traffic by keeping the VoIP ertPS SF in existence, but with no allocated bandwidth until BW is needed for real-time traffic, i.e., VoIP traffic. Bandwidth requests for the other SFs, i.e., BE for non-VoIP traffic, and an nrtPS SF for VoIP signaling traffic are provisioned at "2" and "3" in FIG. 5A.

Thus, with no call in progress, the MS is active with six SFs. VoIP signaling traffic is sent via the non-real-time service flows based on the pre-provisioned static classification rules. All other traffic is sent via the default service flows. The MS periodically sends a Bandwidth Request Header equal to 0 to the BS to ensure unsolicited bandwidth grants for the extended real-time service flow remain suspended until a call is made or received.

When a call is made by the subscriber or is received by the subscriber (see "4" in FIG. 5A), neither the MS nor the BS are aware of call events. Traffic is classified according to static pre-provisioned classification rules. When the MS detects traffic for the extended real-time service flow, it immediately sends a Channel Quality Indicator Channel (CQICH) codeword to the BS to resume unsolicited resource grants (see "5" and "6"). The BS resumes grants equal to the MSTR per the pre-provisioned unsolicited grant interval. The MS sends bandwidth requests to the BS to adjust the MSTR and corresponding unsolicited resource grants for the extended real-time service flow according to the bandwidth required for the call.

Figure 5B:
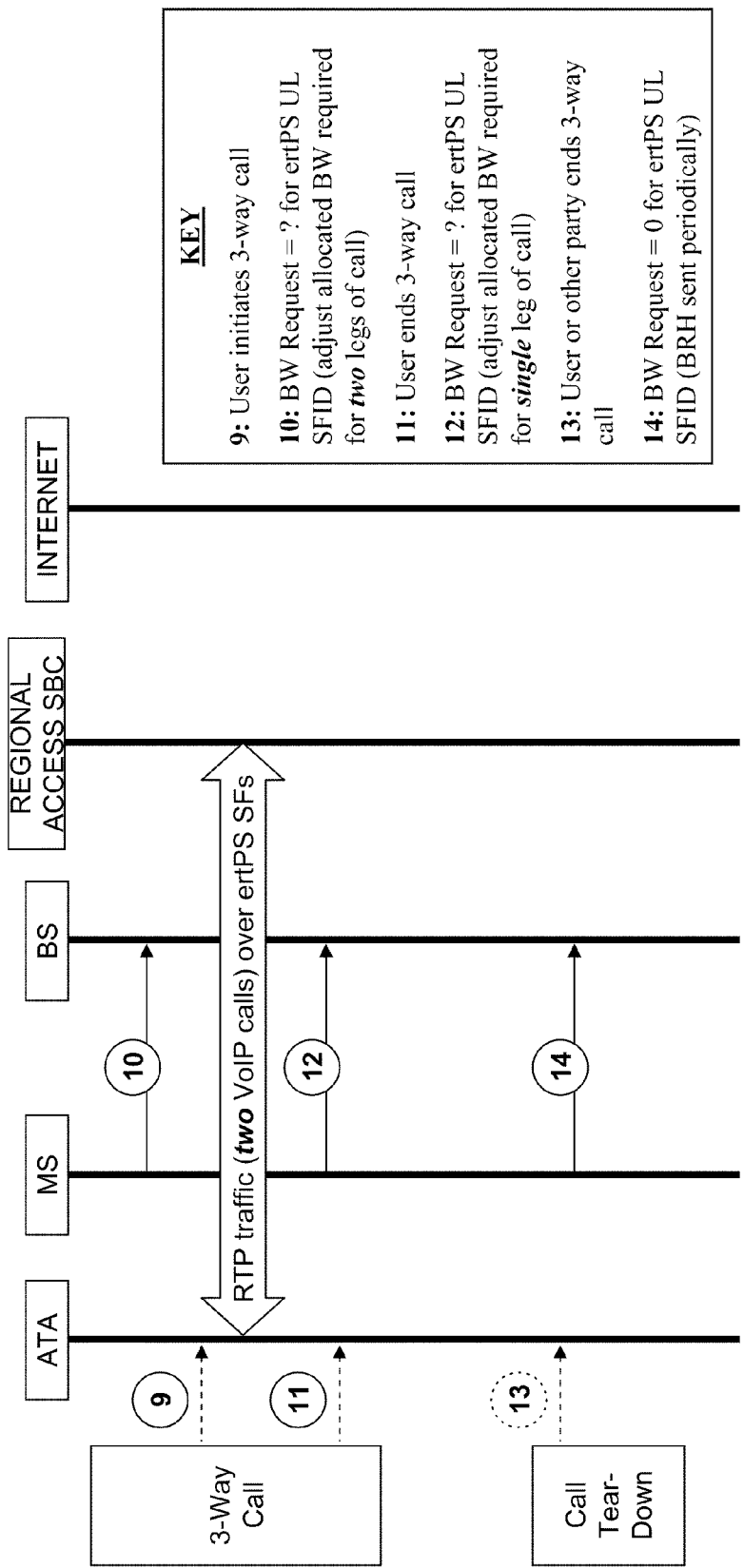
FIG. 5B illustrates exemplary call flows for a three-way call event and a call tear-down process flow.

Turning now to FIG. 5B, if the subscriber initiates a three-way call (see "9"), neither the MS nor the BS are aware of call events. Traffic is classified according to static pre-provisioned classification rules. The MS sends bandwidth requests to the BS to adjust the unsolicited grant allocations for the extended real-time service flow to the amount required by the two VoIP bearer traffic streams (see "10").

When the MS detects that it no longer has data queued for the extended real-time service flow, call "tear down" commences, and the MS sends a Bandwidth Request Header equal to "0" to suspend unsolicited bandwidth grants from the BS (see "14"). The BS suspends resource grants until the next call is made or received.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of providing voice communications in a wireless packet communications system, the method comprising:
    registering a communications path between a gateway and a base station (BS);
    establishing a real-time service flow and one or more non-real-time service flows in the BS, wherein traffic to and from the BS is classified and directed to the real-time service flow or the one or more non-real-time service flows based on static pre-provisioned traffic classification rules;
    activating the real-time service flow and the one or more non-real-time service flows over an air interface between the BS and a terminal device;
    processing a first request, from the terminal device, that zero bandwidth be allocated by the BS to the activated real-time service flow in the absence of voice traffic to or from the terminal device, and that, in the absence of the voice traffic, bandwidth be allocated by the BS to the activated one or more non-real time service flows for communication of signaling or non-voice traffic;
    processing a second request, from the terminal device, that sufficient bandwidth be allocated by the BS to the activated real-time service flow when voice traffic to or from the terminal device is detected;
    classifying data traffic from the terminal device as the voice traffic under the activated real-time service flow or as signaling or non-voice traffic under the one or more non-real-time service flows based on the static pre-provisioned traffic classification rules; and
    transmitting and/or receiving the voice traffic over the registered communications path via the activated real-time service flow.

2. The method of claim 1, wherein the voice traffic is packetized Voice-Over-IP (VoIP) data.

3. The method of claim 1, further comprising maintaining the activated real-time service flow at a zero bandwidth amount in the absence of voice traffic to or from the terminal device, wherein a bandwidth request for the activated real-time service flow of zero bandwidth is periodically sent to the BS to ensure that unsolicited bandwidth grants from the BS to the terminal device remain suspended until a voice call is made or received.

4. The method of claim 1, wherein the wireless packet communications system is a Long Term Evolution (LTE) system, wherein the method further comprises:
    establishing three pairs of service flows between the BS and the terminal device,
    wherein a first pair of service flows comprises a best effort (BE) service flow for BE traffic and VoIP control and statistics traffic,
    wherein a second pair of service flows comprises a non-real-time service flow for VoIP signaling traffic, and
    wherein a third pair of service flows comprises an extended real-time service flow with silence suppression for VoIP bearer traffic.

5. The method of claim 4, wherein each of the three pairs of service flows each have different Quality-of-Service (QoS) parameters associated therewith.

6. The method of claim 1, further comprising granting an unsolicited grant of bandwidth equal to a predetermined bandwidth value before the terminal device requests any zero or non-zero bandwidth from the BS.

7. The method of claim 6, wherein the wireless packet communications system is a WiMAX system, the activated real-time service flow is a WiMAX extended real-time service flow, and the predetermined bandwidth value is equal to a Maximum Sustained Traffic Rate (MSTR) per an unsolicited grant interval.

8. The method of claim 1, wherein the wireless packet communications system is a Long Term Evolution (LTE) 4G system.

9. The method of claim 1, further comprising resuming an unsolicited grant of bandwidth equal to a predetermined bandwidth value after voice traffic to or from the terminal device is detected.

10. A network node in a wireless packet communications network, the node comprising:
    a transceiver configured to selectively transmit and receive data over the wireless network; and
    a processor operatively coupled to the transceiver and configured to:
        activate a real-time service flow and one or more non-real-time service flows over an air interface between the network node and another node in the wireless network;
        process a request that zero bandwidth be allocated to the activated real-time service flow in the absence of voice traffic over the air interface, and that, in the absence of the voice traffic, bandwidth be allocated to the activated one or more non-real time service flows for communication of signaling or non-voice traffic;
        process a request that sufficient bandwidth be allocated to the activated real-time service flow when voice traffic over the air interface is detected;

classify data traffic from the terminal device as the voice traffic under the activated real-time service flow based on a first of static pre-provisioned traffic classification rules;

classify the data traffic from the terminal device as signaling or non-voice traffic under the one or more non-real-time service flows based on a second of the static pre-provisioned traffic classification rules; and communicate the voice traffic to a different network via a registered communications path.

11. The network node of claim 10, wherein the voice traffic is packetized Voice-Over-IP (VoIP) data.

12. The network node of claim 10, wherein the processor is further configured to establish the one or more non-real-time service flows to manage the voice traffic.

13. The network node of claim 10, wherein the processor is further configured to maintain the activated real-time service flow at a zero bandwidth amount in the absence of voice traffic over the air interface, wherein a bandwidth request for the activated real-time service flow of zero bandwidth is periodically processed to ensure that unsolicited bandwidth grants over the air interface remain suspended until a voice call is detected.

14. The network node of claim 10, wherein the wireless packet communications network is a Long Term Evolution (LTE) network, wherein the processor is further configured to:

establish three pairs of service flows over the air interface, wherein a first pair of service flows comprises a best effort (BE) service flow for BE traffic and VoIP control and statistics traffic, wherein a second pair of service flows comprises a non-real-time service flow for VoIP signaling traffic, and wherein a third pair of service flows comprises an extended real-time service flow with silence suppression for VoIP bearer traffic.

15. The network node of claim 14, wherein each of the three pairs of service flows each have different Quality-of-Service (QoS) parameters associated therewith.

16. The network node of claim 10, wherein the processor is further configured to process an unsolicited grant of bandwidth equal to a predetermined bandwidth value before any bandwidth request is processed.

17. The network node of claim 16, wherein the wireless packet communications network is a WiMAX network, the activated real-time service flow is a WiMAX extended real-time service flow, and the predetermined bandwidth value is equal to a Maximum Sustained Traffic Rate (MSTR) per an unsolicited grant interval.

18. The network node of claim 10, wherein the wireless packet communications network is a Long Term Evolution (LTE) system.

19. The network node of claim 10, wherein the network node is a an LTE base station.

20. The network node of claim 10, wherein the network node is an LTE terminal device.

21. The network node of claim 20, wherein the terminal device comprises an LTE-capable mobile device.

22. The network node of claim 10, wherein the processor is further configured to resume an unsolicited grant of bandwidth equal to a predetermined bandwidth value after voice traffic is detected over the air interface.

23. A wireless packet communications system, comprising:

a communications path registered between a gateway and a base station (BS), a real-time communications path established through the BS to a terminal device over an air interface, and a non-real-time service path established through the BS to a terminal device to manage the voice traffic over the air interface;

wherein traffic to and from the BS is classified and directed to the real-time service communications path or the non-real-time service path based on static pre-provisioned traffic classification rules, wherein the terminal device requests that zero bandwidth be allocated by the BS to the real-time communications path in the absence of voice traffic on the air interface, and that, in the absence of the voice traffic, bandwidth be allocated by the BS to the non-real-time service path for communication of signaling or non-voice traffic, wherein the terminal device requests that sufficient bandwidth be allocated by the BS to the real-time communications path when voice traffic is detected on the air interface, wherein the BS classifies data traffic from the terminal device as the voice traffic for the real-time communications path or as signaling or non-voice traffic for the non-real-time service path based on the static pre-provisioned traffic classification rules, and wherein the BS forwards the voice traffic over the registered communications path to another network.

24. The system of claim 23, wherein said another network comprises the Internet.

25. The system of claim 23, wherein the voice traffic is packetized Voice-Over-IP (VoIP) data.

26. The system of claim 23, wherein the real-time communications path is provisioned with a zero bandwidth amount in the absence of voice traffic over the air interface, wherein a bandwidth request for the real-time communications path of zero bandwidth is periodically transmitted by the terminal device to ensure that unsolicited bandwidth grants over the air interface remain suspended until a voice call is detected.

27. The system of claim 23, wherein the wireless packet communications system is a Long Term Evolution (LTE) system, wherein the BS is configured to:

establish three pairs of service flows over the air interface, wherein a first pair of service flows comprises a best effort (BE) service flow for BE traffic and VoIP control and statistics traffic, wherein a second pair of service flows comprises a non-real-time service flow for VoIP signaling traffic, and wherein a third pair of service flows is associated with the real-time communications path and comprises an extended real-time service flow with silence suppression for VoIP bearer traffic.

28. The system of claim 27, wherein each of the three pairs of service flows each have different Quality-of-Service (QoS) parameters associated therewith.

29. The system of claim 23, wherein the BS is configured to grant an unsolicited grant of bandwidth equal to a predetermined bandwidth value to the terminal device before any bandwidth request is processed.

30. The system of claim 29, wherein the wireless packet communications system is a WiMAX system, the real-time communications path comprises a WiMAX extended real-time service flow, and the predetermined bandwidth value is equal to a Maximum Sustained Traffic Rate (MSTR) per an unsolicited grant interval.

31. The system of claim 23, wherein the wireless packet communications system is a Long Term Evolution (LTE) system.

32. The system of claim 23, wherein the BS comprises an LTE base station.

33. The system of claim 23, wherein the terminal device comprises an LTE-capable terminal device.

34. The system of claim 33, wherein the LTE-capable terminal device comprises an LTE-capable mobile device.

35. The system of claim 23, wherein the BS is configured to resume an unsolicited grant of bandwidth equal to a predetermined bandwidth value after voice traffic is detected over the air interface.

36. An article of manufacture comprising a physical non-transitory computer-readable medium, said physical non-transitory computer-readable medium containing computer instructions thereon which, when executed by a processor, cause the processor to carry out a plurality of operations comprising:

activating a real-time service flow and one or more non-real-time service flows over an air interface between a first network node and a second node in a wireless packet communications network;

processing a request that zero bandwidth be allocated to the activated real-time service flow in the absence of voice traffic over the air interface, and that, in the absence of the voice traffic, bandwidth be allocated to the activated one or more non-real time service flows for communication of signaling or non-voice traffic;

processing a request that sufficient bandwidth be allocated to the activated real-time service flow when voice traffic over the air interface is detected;

classifying data traffic as the voice traffic under the activated real-time service flow based on a first of static pre-provisioned traffic classification rules;

classifying the data traffic as signaling or non-voice traffic under one or more non-real-time service flows based on a second of the static pre-provisioned traffic classification rules; and passing the voice traffic to a different network via a registered communications path.

37. The method of claim 1, wherein the data traffic is classified as the voice traffic under the activated real-time service flow based on the static pre-provisioned traffic classification rules including a range of Real-Time Protocol (RTP) port numbers assigned by a controller and an Internet Protocol (IP) address of the controller.

38. The method of claim 1, wherein the data traffic is classified as the signaling or control traffic under the one or more non-real-time service flows based on the static pre-provisioned traffic classification rules further including a common Session Initiation Protocol (SIP) port number.

39. The network node of claim 10, wherein the first of static pre-provisioned traffic classification rules includes a range of Real-Time Protocol (RTP) port numbers assigned by a controller and an Internet Protocol (IP) address of the controller.

40. The network node of claim 10, wherein the second of the static pre-provisioned traffic classification rules includes a common Session Initiation Protocol (SIP) port number.

\* \* \* \* \*